United States Patent
Herling

(10) Patent No.: US 6,504,918 B1
(45) Date of Patent: Jan. 7, 2003

(54) METHOD AND CIRCUIT FOR OPERATING A TELECOMMUNICATIONS NETWORK

(75) Inventor: Wolfgang Herling, Hennef (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/380,801

(22) PCT Filed: Jan. 24, 1998

(86) PCT No.: PCT/DE98/00213

§ 371 (c)(1),
(2), (4) Date: Dec. 7, 1999

(87) PCT Pub. No.: WO98/39908

PCT Pub. Date: Sep. 11, 1998

(30) Foreign Application Priority Data

Mar. 6, 1997 (DE) .......................... 197 09 240

(51) Int. Cl.[7] .............................................. H04M 11/00
(52) U.S. Cl. ................................ 379/93.12; 379/114.21
(58) Field of Search ........................ 379/93.12, 100.04, 379/91.01, 91.02, 114.06, 114.07, 114.22, 114.21, 114.25

(56) References Cited

U.S. PATENT DOCUMENTS

| | | | |
|---|---|---|---|
| 4,879,742 A | 11/1989 | Taniguchi et al. | |
| 4,933,966 A | 6/1990 | Hird et al. | |
| 5,148,474 A | 9/1992 | Haralamborpoulos et al. | |
| 5,438,616 A | 8/1995 | Peoples | |
| 5,602,907 A | 2/1997 | Hata et al. | |
| 5,646,984 A | * 7/1997 | Oda ........................... | 379/114 |
| 5,815,560 A | * 9/1998 | Kasai et al. ................ | 379/114 |
| 5,822,411 A | * 10/1998 | Swale et al. ................ | 379/114 |
| 6,061,436 A | * 5/2000 | Bauer et al. ................ | 379/114 |

FOREIGN PATENT DOCUMENTS

| | | |
|---|---|---|
| DE | 195 16 364 | 11/1995 |
| DE | 195 22 988 A1 | 1/1997 |
| WO | WO 92/01350 | 1/1992 |
| WO | WO 96/15616 | 5/1996 |
| WO | WO 96 34471 | 10/1996 |
| WO | WO 96/37848 | 11/1996 |

OTHER PUBLICATIONS

John Taylor, "Call Behaviour Analysis," telekom/praxis, No. 9/96, vol. 73, pp. 39 and 40.

* cited by examiner

*Primary Examiner*—Stella Woo
(74) *Attorney, Agent, or Firm*—Kenyon & Kenyon

(57) ABSTRACT

A method and a circuit arrangement for the implementation of services via a telecommunications network. The services are, for example, backward/forward tariffing and data documentation via a telecommunications network. Backward tariffing, for example, enables the called party to invoice to the calling party any desired amount for a service provided via a telecommunications network. The operator of the telecommunications network is instructed by the called party and the calling party to collect this amount from the calling party. The data documentation service allows contracts concluded by the called and calling parties over the telephone to be confirmed by a third party—telecommunications network—with regard to the fact that the contract has been entered into and, if requested by the calling party and the called party, with regard to the contents of the contract. The circuit arrangement includes a telecommunications network having switching systems, to which specific terminals of the calling party and of the called party are associated, and of a control circuit for forward/backward tariffing and/or a control circuit for "data documentation." Terminals are connected via signaling channels, a communications channel and information paths to the switching systems which, in turn, are connected via information paths to the aforementioned control circuits.

7 Claims, 1 Drawing Sheet

METHOD AND CIRCUIT FOR OPERATING A TELECOMMUNICATIONS NETWORK

FIELD OF THE INVENTION

The present invention relates to a method and circuit arrangement for the operation of a telecommunications network to implement services, such as forward and backward tariffing or documentation of information and data.

RELATED TECHNOLOGY

In existing analog communications networks, processes for communications tariffing have been used. These processes offer the possibility of controlling the traffic in the network by the price. Thus, for example, so-called 'moonlight tariffs' were used in the eighties, which employ a rigid tariff structure subdivided into a few tariff groups. Although, in principle, these processes allow the traffic to be controlled by the price, such a method is not suitable for backward tariffing and forward tariffing. Furthermore, the division into defined time-dependent price groups does not take account of the actual line load. Recently, methods have become known which allow the call behavior of individuals or of groups of persons to be measured in a relatively inexpensive manner. So-called call behavior analysis methods allow such profiles to be measured or produced through the evaluation of measurement results. In "telekom/praxis", No. 9/96, Vol. 73, a call behavior analysis (CBA) system of Hewlett-Packard is described by John Taylor under the title "Call Behavior Analysis" on pages 39 and 40. Although such a system is suitable for controlling the traffic by dynamically measuring the actual network load at a given instant, it does not provide any possibility for backward and forward tariffing or for the documentation of data/information.

In International Patent Application Publication No. WO A 96 34471 (Katz, Aaron B), Oct. 31, 1996, a method is described which depicts the sequence of a purchasing process using an identification number, the calling party, or buyer, and the called party, or seller, agreeing with each other with respect to the purchase/sale. Thereupon, the calling party initiates processes so that the money amount for the purchase can be credited or debited. The entries such as account balance and personal identification number are examined and, in the event of a positive examination result, actions are taken accordingly. In order for a purchase or sale to take place, the buyer requires a personal identification number. Its issuance and administration are brought about by the seller, if the buyer is included as a customer of the seller in the customer list. Only after the customer is registered as buyer and has received a personal identification number can transactions be performed. The assignment of roles is thus fixed, in that the calling party is the buyer and the called party the seller.

Not made possible in this manner are the execution and completion of spontaneous purchases/sales, such as a reader immediately reacting to a classified advertisement in a daily newspaper with respect to an item wanted/offered for sale of a person seeking to buy (buyer)/person seeking to sell (seller) and simultaneously executing and concluding for legal purposes the buying/selling process using a telecommunications network.

In addition, in U.S. Pat. No. 5,602,907 (Hata Emi et al), Feb. 11, 1997, a method is described in which a participating terminal transmits information during a telecommunications connection to the telecommunications network, to the effect that the agreed debit amount for the communications fee between the respective terminals has been changed to a defined different debit amount. After conveying this information, the communications network debits the respective terminal at the new charge. In other words, this means that the method described here has as its subject matter changing the debit amount for a telecommunications connection during the continuance of a telecommunications connection. It is not possible, using this method, to arrive at agreement concerning a sum of money of any amount between calling party and called party and to transfer it with an acknowledgment, independently of the charging system of a telecommunications network.

SUMMARY OF THE INVENTION.

The object of the present invention is, therefore, to create a method and a system/circuit arrangement for telecommunications networks which permit new services to be offered through integrated functions, such as forward/backward tariffing or the documentation of data/information.

The present invention provides a method used to operate a telecommunications network having connected devices or terminals of calling parties and called parties as well as a corresponding switching system for the calling party and a corresponding switching system for the called party for the purpose of implementing services such as forward and backward tariffing, the communications exchange between the calling party and the called party taking place via a communications channel. For forward or backward tariffing, a signal is sent from the terminal of the calling party as well as from terminal of the called party via signaling channels to telecommunications network to the effect that the forward or backward tariffing service is to be used. In the cases of backward and forward tariffing, the size of the amount, the method of invoicing, and whether it is to be forward or backward tariffing, is sent from the terminal of the calling party or the terminal of the called party via information paths for forward and backward tariffing to a circuit arrangement of the telecommunications network The consents of the calling party and of the called party to backward tariffing for the forward and backward tariffing and the corresponding information and data are stored in the circuit arrangement for the control of forward/backward tariffing via the terminals of the calling party and the called party and via the information paths for forward and backward tariffing. The information and data transmitted are automatically checked by the circuit arrangement and, if necessary, query operations are initiated in a processor-controlled manner. If the specifications are complete and in agreement, the telecommunications network causes the financial transaction to be carried out in the manner prescribed either through backward tariffing in that the amount is collected from the calling party by the provider of the telecommunications service, the amount then being transferred to the called party, or the data of the calling party required for invoicing is transmitted to the called party, or through forward tariffing in that the amount is collected from the called party by the provider of the telecommunications service, the amount then being transferred to the calling party, or the data of the called party required for invoicing is transmitted to the calling party, and the termination of the service is then initiated.

The present invention also provides a circuit arrangement for implementing a method used to operate a telecommunications network having connected devices or terminals of calling parties and called parties as well as a corresponding switching system for the calling party and a corresponding switching system for the called party for the purpose of implementing services such as forward and backward tariffing and/or information documentation. The associated switching system of the calling party and the associated switching system of the called party are connected, via signaling channels, a communications channel, and information paths for backward tariffing and forward tariffing and for the information documentation service, to the respective terminals of the calling party and the called party, and the telecommunications network contains the circuit arrangement for the control of forward/backward tariffing and the circuit arrangement for the automatic control for functional sequences and operations for the information documentation service, the circuit arrangement being connected via the information paths to both switching systems.

The integration of functional sequences or processor-controlled operations for backward and forward tariffing as well as for the documentation of data or information makes it possible, automatically in a processor-controlled manner, to ensure backward or forward tariffing or the documentation of data or information. This allows new services such as backward tariffing to be offered. The called party is able, via the existing telecommunications network, to invoice to the calling party any desired amount, such as for a service provided by a lawyer or service-providing company. The operator of the telecommunications network is instructed by the called party and by the calling party to collect said amount from the calling party. In the case of backward tariffing, for example, the calling party wishes to obtain some information, subject to payment, from the called party, say, once again from a lawyer. Once they have agreed on the amount, the calling and called parties are thus in agreement that said amount is invoiced to the calling party by the operator of the telecommunications network and is collected by the latter. The operator of the telecommunications network forwards the amount collected from the calling to the called party.

The new "forward tariffing" service enables the calling party, via a telecommunications network, to invoice to the called party any amount desired, such as for consulting or another service provided. The amount is automatically collected by the network operator in a processor-controlled manner.

Furthermore, a method according to the invention and a system according to the present invention make it possible for the first time to provide a new service called "data documentation via a telecommunications network". A method and a system according to the present invention and a circuit arrangement according to the present invention enable the called party to prove that a specific item of information or specific data has been sent to the calling party, and it is possible for the calling party to prove that a specific item of information has been sent to the called party. Using this service, for example, contracts that are entered into by the called and calling parties over the telephone can be confirmed by a third party—the telecommunications network—with regard to the fact that the contract has been concluded and with regard to the contents of the contract. This service, therefore, documents the exchange of any data, whereas, in the case of backward tariffing and forward tariffing, specific amounts of money are exchanged or, after agreement, transmitted between the calling party and called party, the exchange and the amount being documented in a processor-controlled manner or automatically.

BRIEF DESCRIPTION OF THE DRAWINGS

Below, the present invention is described in detail with reference to exemplary embodiments

DETAILED DESCRIPTION

Figure 1:
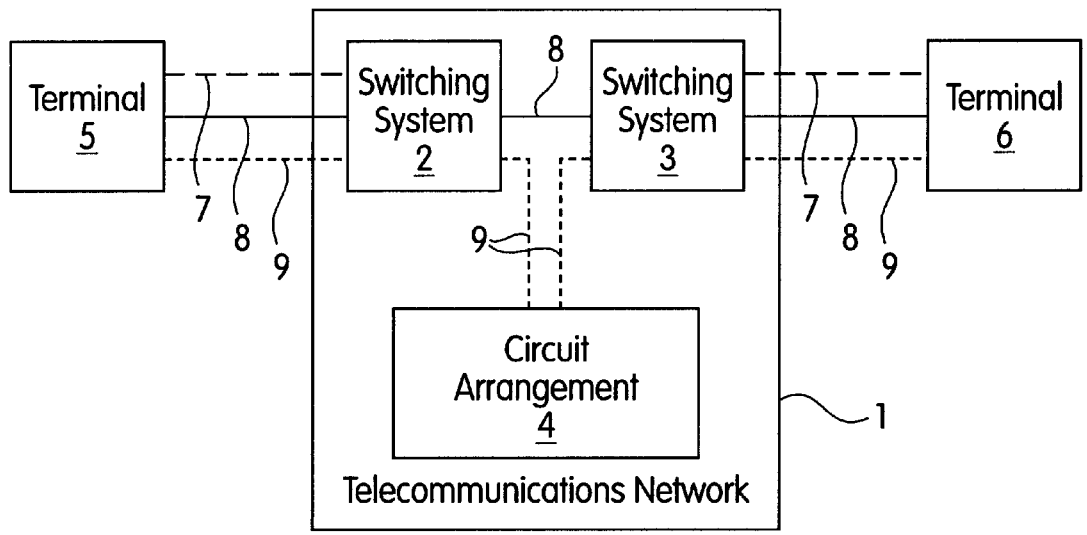
FIG. 1 shows a schematic diagram of a system for backward and forward tariffing.

In the Figures, and, specification, identical parts are identified by identical reference characters, which are given in the appended list of reference characters.

FIG. 1 shows a system or block diagram for the services "backward tariffing and forward tariffing" in a telecommunications network 1. Telecommunications network 1 is composed of a switching system 2 associated to the calling party and a switching system 3 associated to the called party. In addition, telecommunications network 1 is composed of a circuit arrangement for accepting the orders for backward/forward tariffing as well as for producing invoices, for monitoring the receipt of payments, for sending reminders whenever necessary, and for transferring the amounts received, etc. A terminal 5 of the calling party is connected to switching system 2 associated to the calling party via a signaling channel 7, a communication channel 8 and an information path 9 for backward and forward tariffing. A terminal 6 of the called party is likewise connected, via a signaling channel 7, a communications channel 8 and an information path 9 for backward and forward tariffing, to switching system 3 of telecommunications network 1 associated to the called party. Furthermore, switching systems 2 and 3 for the calling party and the called party are connected to each other via communications channel 8 and, via separate information paths 9, to circuit arrangement/apparatus 4 for receiving the orders for backward/forward tariffing as well as for producing invoices, for monitoring the receipt of payments, for sending reminders whenever necessary, and for transferring the amounts received. This apparatus/circuit arrangement 4 executes the following functions from the point of view of the calling party:

In the case of backward tariffing, this circuit arrangement controls the invoicing and, whenever necessary, the sending of a reminder for the calling party; and in the case of forward tariffing, it controls the transfer of the payment received from the called party to the calling party. From the point of view of the called party (terminal 6), in the case of forward tariffing, circuit arrangement/apparatus 4 controls the invoicing and, whenever necessary, the sending of a reminder to the called party; and in the case of backward tariffing, it controls the transfer of the amount received from the calling party to the called party.

Signaling channels 7 between telecommunications network 1 and terminal 5 of the calling party, as well as between telecommunications network 1 and terminal 6 of the called party, signal whether there is an exchange of communications between the calling party and called party or an exchange of data within the framework of the "backward tariffing" or "forward tariffing" services.

Communications channel 8 is used for the exchange of communications between terminal 5 of the calling party and terminal 6 of the called party. This may be, for example, a normal telephone connection in the telephone network.

Information paths 9 are used for the "backward tariffing" and "forward tariffing" services. Below, the operational or functional sequence of "backward tariffing" and "forward tariffing" is described with reference to FIG. 1.

For this purpose, it is necessary that the following requirements be met:

Between the calling party and the called party there exists a transparent communication channel—such as a telephone connection between the calling party and the called party in the telephone network of Deutsche Telekom. The calling and called parties have agreed that forward or backward tariffing should take place via the telecommunications network.

The following basic operations or methods may be executed:

"Backward Tariffing"

Step/Operation 1.1

The calling party signals via a terminal 5 to telecommunications network 1 that the "backward tariffing" service is to be used;

the calling party triggers a corresponding signal which is forwarded from terminal 5 via signaling channel 7 to switching system 2. Switching system 2 thereupon establishes the information path 9 between terminal 5 and circuit arrangement 4. The section between terminal 5 and switching system 2 of information path 9 is implemented as follows:

a) there is a separate physical transmission path between terminal 5 and switching system 2; or b) the communications channel 8 between terminal 5 and switching system 2 is temporarily interrupted. The physical transmission medium allowing the communications channel 8 to be set up between terminal 5 and switching system 2 is temporarily used by information path 9; or c) the signaling channel 7 between terminal 5 and switching system 2 is co-used in order to physically transmit data of information path 9 from terminal 5 to switching system 2.

All the following inputs, data exchanges take place via information path 9 of terminal 5—switching system 2—circuit arrangement 4,:

the amount to be invoiced to him in favor of the called party;

how the amount is to be invoiced;

1) by collection by the telecommunications service provider who collects the amount from the calling party and transfers it to the called party; or 2) by direct invoicing by the called party to the calling party;

and—the consent that the data required for backward tariffing may be stored for a lengthy period of time in telecommunications network 1. Storage is required to enable the called party, if necessary, to use the data to prove his justified claims on the calling party. Any interruption of the communication channel 8 between terminal 5 and switching system 2 is canceled.

Step/Operation 1.2

Via his terminal 6, the called party signals to telecommunications network 1 that the "backward tariffing" service is to be used;

the calling party triggers a corresponding signal which is forwarded from terminal 6 via signaling channel 7 to switching system 3. Switching system 3 thereupon establishes information path 9 between terminal 6 and circuit arrangement 4. The section of information path 9 between terminal 6 and switching system 3 is implemented as follows:

a) there is a separate physical transmission path between terminal 6 and switching system 3; or b) the communications channel 8 between terminal 6 and switching system 3 is temporarily interrupted. The physical transmission medium allowing communications channel 8 to be set up between terminal 6 and switching system 3 is temporarily used by information path 9; or c) the signaling channel 7 between terminal 6 and switching system 3 is co-used in order to physically transmit data of information path 9 from terminal 6 to switching system 3.

All the following inputs, data exchanges take place via information path 9, terminal 6 switching system 3—circuit arrangement 4:

the amount to be invoiced to the calling party;

how the amount is to be invoiced;

1) by collection by the telecommunications service provider who collects the amount from the calling party and transfers it to the called party; or 2) by direct invoicing by the called party to the calling party;

and—the consent that the data required for backward tariffing may be stored for a lengthy period of time in telecommunications network 1. Storage is required to enable the called party, if necessary, to use the data to prove his justified claims on the calling party. Any interruption of communication channel 8 between terminal 6 and switching system 3 is canceled.

Step/Operation 1.3

Telecommunications network 1 has received all information required according to steps 1.1 and 1.2. A check is made as to whether the information given by the called party and the calling party is identical, particularly with regard to the amount of the payment, the method of invoicing and the consent given to the storage of data. If there is a difference between the information given, telecommunications network 1 automatically checks with the calling party and called party. If the information given by both parties is complete and identical, a message is sent to the effect that the requested invoicing will take place (in the case of collection) or telecommunications network 1 arranges for the data of the calling party to be forwarded to terminal 6 of the called party so that the called party itself can invoice the calling party and, where appropriate, send the invoice to the calling party via communications network 1. The current session of the "backward tariffing" service is then terminated.

"Forward Tariffing"

Forward tariffing is carried out analogously to the "backward tariffing" operations i.e., the flow of information for the chargeable service and the flow of money are precisely reversed.

Figure 2:
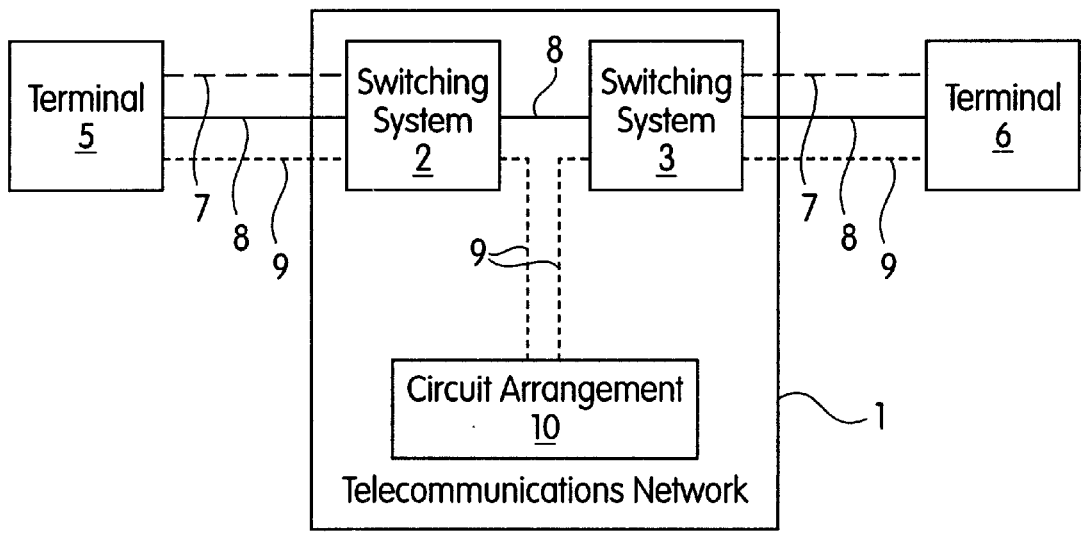
FIG. 2 shows a schematic diagram of a system for the documentation of information or data via a telecommunications network.

FIG. 2 shows a circuit arrangement/system for the service "data documentation via a telecommunications network." Once again, the system/circuit arrangement in FIG. 2 includes telecommunications network 1 having switching systems 2 and 3, respectively, for the calling party and the called party, an apparatus/circuit arrangement 10 for receiving the orders for "data documentation via a telecommunications network" and for their execution. Furthermore, switching systems 2 and 3, respectively, are connected to one or more terminals 5 and 6 of the calling and the called parties. Once again, signaling channels 7, communication channel 8, and information paths 9 are used for the connection.

Apparatus 10 is connected to information paths 9. The "data communication via a telecommunications network" service allows contracts concluded by the called and calling parties over the telephone to be confirmed by a third party—the telecommunications network—with regard to the fact that the contract has been entered into and with regard to the contents of the contract. A prerequisite is the existence of a transparent communications channel between the calling and called parties. This may be, for example, a telephone connection between the calling and called parties in the telephone network of Deutsche Telekom. The calling party and the called party have agreed that a data documentation is to take place via the telecommunications network. It is for this reason that two cases of data documentation are described in detail below; i.e., the operational/process steps are indicated which are necessary for this service in a circuit arrangement/system according to FIG. 2

Case 1 Documented Data Flow From Called Party Calling Party

Step/Operation 1.1

Via his terminal 5, the calling party signals to telecommunications network 1 that the "data documentation via a telecommunications networks" service is to be used;

the calling party triggers a corresponding signal which is forwarded from terminal 5 via signaling channel 7 to switching system 2. Switching system 2 thereupon establishes information path 9 between terminal 5 and circuit arrangement 10. The section of information path 9 between terminal 5 and the switching system 2 is implemented as follows:

a) there exists a separate physical transmission path between terminal 5 and switching system 2; or b) communications channel 8 between terminal 5 and switching system 2 is temporarily interrupted. The physical transmission medium which allows communications channel 8 between terminal 5 and switching system 2 is temporarily used by information path 9; or c) signaling channel 7 between terminal 5 and switching system 2 is co-used in order to physically transmit data of the information path 9 from terminal 5 to switching system 2.

All the following inputs, data exchanges take place via information path 9, terminal 5 switching system 2—circuit arrangement 10:

how the data to be documented shall be forwarded to the calling party by telecommunications network 1

1) by letter post: indication of address;

2) by fax: indication of fax number; or 3) by e-mail: communication of e-mail address;

and—whether the additional feature "storage of the documented data in the telecommunications network 1" is to be used.

Step/Operation 1.2

Via his terminal 6, the called party signals to telecommunications network 1 that the "data documentation via a telecommunications network 1" service is to be used;

the called party triggers a corresponding signal which is forwarded from terminal 6 via signaling channel 7 to switching system 2. Switching system 2 thereupon establishes information path 9 between terminal 6 and circuit arrangement 10. The section of the information path 9 between terminal 6 and switching system 2 is implemented as follows:

a) there exists a separate physical transmission path between terminal 6 and switching system 3; or b) communications channel 8 between terminal 6 and switching system 3 is temporarily interrupted. The physical transmission medium allowing communications channel 8 to be set up between terminal 6 and switching system 3 is temporarily used by information path 9; or c) signaling channel 7 between terminal 6 and switching system 3 is co-used in order to physically transmit data of information path 9 from terminal 6 to switching system 3.

All the following inputs, data exchanges take place via information path 9, terminal 6 switching system 3—circuit arrangement 10:

how the acknowledgment of the data communication is to be forwarded to the called party from the telecommunications network 1

1) by letter post: communication of address;

2) by fax: communication of fax number; or 3) by e-mail: communication of e-mail address;

and—whether the additional feature "storage of the documented data in the telecommunications network 1" is to be used.

Step/Operation 1.3

Telecommunications network 1 has received all data required according to steps 1.1 and 1.2. A signal is transmitted to called party to start data communication.

Step/Operation 1.4

The called party communicates to telecommunications network 1 the data to be documented.

Step/Operation 1.5

Telecommunications network 1 communicates (fax, e-mail) or arranges (letter post) the transmission of the data to be documented to the calling party in the manner specified according to step 1.1 and additionally stores the data if storage was requested in steps 1.1 and 1.2.

Step/Operation 1.6

Telecommunications network 1 informs the called party that:

the forwarding of the documented data to the calling party has been arranged;

if steps 1.1 and 1.2 were answered correspondingly, the data to be documented is stored in telecommunications network 1; and it will receive—according to step 1.2 and in the specified manner (letter post, fax, e-mail)—an acknowledgment with the following information 1) the data to be documented;

2) the details of the recipient (name, address);

3) date and time of the data documentation order given by the calling party and the called party;

4) date and time of the execution of the data documentation order with details of how the data to be documented shall be communicated to the recipient (letter post, fax, e-mail); and 5) confirmation that the data to be documented has been stored in telecommunications network 1 if this was requested according to steps 1.1 and 1.2.

Step/Operation 1.7

The current session of the service "data documentation via a telecommunications network 1 is terminated."

Case 2 Documented Data Flow From Calling Party to Called Party

This case is carried out analogously to case 1 described above.

List of Reference Characters

1 Telecommunications network
2 Switching system of calling party
3 Switching system of called party
4 Circuit arrangement used to control forward/backward tariffing and other functions
5 Terminal/apparatus of calling party 6 Terminal/apparatus of called party
7 Signaling channels
8 Communications channel
9 Information paths for forward/backward tariffing
10 Circuit arrangement used for automatically controlling functional sequences/operations required for the documentation of information and data

What is claimed is:

1. A method for operating a telecommunications network to implement at least one service, the at least one service including at least one of a forward tariffing service and a backward tariffing service, the telecommunications network including a connected first terminal and a first switching system and a connected second terminal and a second switching system, the first terminal and the first switching system being associated with a calling party, the second terminal and the second switching system being associated with a called party, the method comprising:

exchanging communications between the calling party and the called party via a communications channel;

sending, for the forward or the backward tariffing service, from the first terminal and from the second terminal via respective first and second signaling channels to the telecommunications network, corresponding signals for the forward or the backward tariffing service, the corresponding signals indicating that the forward or the backward tariffing service is to be used;

sending, for the forward or the backward tariffing service, from the first terminal and second terminal to a circuit arrangement of the telecommunications network, via respective information paths associated with the first and second terminals, respective corresponding data including at least one of an amount, a method of invoicing, and an indication of whether forward or backward tariffing is to be performed;

sending, for the forward or the backward tariffing service, from the first terminal and second terminals to the circuit arrangement, via the respective information paths, respective corresponding consents of the calling party and of the called party to backward tariffing and to storing the respective corresponding data in the circuit arrangement;

automatically checking, using the circuit arrangement, at least the sent respective corresponding data and, if necessary, initiating query operations in a processor-controlled manner;

if the sent respective corresponding data from the first and second terminals are complete and in agreement, the telecommunications network triggers a financial transaction to be effected either:

through backward tariffing, an amount being collected from the calling party by a provider of the at least one service and then transferred to the called party, or invoicing data of the calling party being transmitted to the called party; or through forward tariffing, the amount being collected from the called party by the provider of the at least one service and the then transferred to the calling party, or the invoicing data of the called party being transmitted to the calling party; and initiating a termination of an operation of the at least one service.

2. The method as recited in claim 1 wherein the at least one service includes an information documentation via the telecommunications network service and further comprising:

sending, for the information documentation service, from the first terminal and the second terminal, via the signaling channels, corresponding respective second signals indicating:

that the information documentation service is to be used;

a first manner in which information for being documented with the information documentation service is to be forwarded by the telecommunications network;

a respective second manner in which the telecommunications network indicates that the information has been sent from the calling party to the called party or from the called party to the calling party; and whether or not the information is to be stored in a second circuit arrangement of the telecommunications network;

automatically checking, using the second circuit arrangement, second data of the sent respective second signals and, if necessary, initiating second query operations in a second processor-controlled manner;

sending, when the checking determines that all the second data is in agreement, a third signal to at least one of the calling and the called party to start a transfer of the information;

communicating, using the first terminal or the second terminal, the information to the telecommunications network, and then initiating, using the telecommunications network in the first manner, to the second terminal or the first terminal, respectively, a transmission of the information, the first manner including at least one communication process, the at least one communication process including at least one of letter post, fax, and e-mail, and simultaneously storing the information using the telecommunications network;

sending, using the telecommunications network, a third signal to the first terminal or to the second terminal indicating that the transmission has been carried out in the first manner and that the information has been stored in telecommunications network;

automatically triggering in a second processor-controlled manner, using the circuit arrangement, an acknowledgment including the information and a confirmation that the information has been stored in the telecommunications network; and signaling a termination of an operation of the information documentation service.

3. A circuit arrangement for operating a telecommunications network to implement at least one service, the at least one service including at least one of a forward tariffing service and a backward tariffing service, the telecommunications network including a connected first terminal and a first switching system and a connected second terminal and a second switching system, the first terminal and the first switching system being associated with a calling party, the connected second terminal and the second switching system being associated with a called party, the circuit arrangement comprising:

a first and a second information path for the backward tariffing and forward tariffing services, a first and a second signaling channel, and a first and a second communications channel, the first and second signaling channels, the first and second communications channels, and a first portion of the first information path and a second portion of the second information path respectively connecting the first and second switching systems, respectively, with the first and second terminals, respectively; and a second circuit arrangement for the control of forward/backward tariffing, the second circuit arrangement being included in the telecommunications network, the second circuit arrangement being connected to the first switching system via a third portion of the first information path and being connected to the second switching system via a fourth portion of the second information path.

4. The circuit arrangement as recited in claim 3 wherein the at least one service includes an information documentation service and further comprising a third circuit arrangement for the automatic control of functional sequences and operations for the information documentation service, the third circuit arrangement being included in the telecommunications network, the third circuit arrangement being connected to the first switching system via a fifth portion of the first information path and being connected to the second switching system via a sixth portion of the second information path.

5. The circuit arrangement as recited in claim 3 wherein the second circuit arrangement is capable of controlling and calculating operations for producing invoices, monitoring receipt of payments, transferring, sending dunning notices when necessary, and storing first information and/or data for the backward and forward tariffing services using processors and storage units.

6. The circuit arrangement as recited in claim 3 wherein the second circuit arrangement includes a first large-scale highly integrated storage unit and an associated first at least one of a microprocessor and a common microprocessor, the first integrated storage unit for storing the first information and/or data.

7. The circuit arrangement as recited in claim 4 wherein and third circuit arrangement includes a second large-scale highly integrated storage unit and an associated second at least one of a microprocessor and a common microprocessor, the second integrated storage unit for storing second information and/or data for the information documentation service.

* * * * *